United States Patent [19]
Wyeth et al.

[11] 3,982,877
[45] Sept. 28, 1976

[54] APPARATUS FOR EXPANDING SEALING A LAMINATED PLASTIC PREFORM

[75] Inventors: Nathaniel Convers Wyeth, Mendenhall, Pa.; Frank William Arnoth, Wilmington, Del.

[73] Assignee: E. I. Du Pont de Nemours and Company, Wilmington, Del.

[22] Filed: Jan. 6, 1975

[21] Appl. No.: 538,759

Related U.S. Application Data

[60] Division of Ser. No. 443,199, Feb. 15, 1974, Pat. No. 3,935,358, which is a continuation-in-part of Ser. No. 346,164, March 29, 1973, abandoned.

[52] U.S. Cl. .................... 425/503; 425/387 B; 425/388
[51] Int. Cl.² ............................................ B29C 17/04
[58] Field of Search ................... 264/89, 92, 96; 425/387, 387 B, 388, 503, 504, 519

[56] References Cited
UNITED STATES PATENTS

| | | | |
|---|---|---|---|
| 2,991,500 | 7/1961 | Hagen | 264/96 |
| 3,099,043 | 7/1963 | Held | 264/92 |
| 3,242,245 | 3/1966 | Greig et al. | 425/388 |
| 3,271,846 | 9/1966 | Buecheze et al. | 29/157.3 |
| 3,281,301 | 10/1966 | Bolesky | 264/94 X |
| 3,289,281 | 12/1966 | Agin et al. | 29/157.3 |
| 3,394,446 | 7/1968 | Valyi | 29/157 X |
| 3,396,430 | 8/1968 | Westcott | 425/503 |
| 3,444,034 | 5/1969 | Hewett | 264/94 |
| 3,537,138 | 11/1970 | Brown et al. | 425/505 |
| 3,655,849 | 4/1972 | Hayashi | 425/503 |
| 3,783,078 | 1/1974 | Brodhead | 425/519 |

FOREIGN PATENTS OR APPLICATIONS

| | | | |
|---|---|---|---|
| 4,536,020 | 6/1965 | Japan | 425/326 |

*Primary Examiner*—Francis S. Husar
*Assistant Examiner*—Carl Rowold

[57] ABSTRACT

Apparatus is disclosed for making a hollow, rib-reinforced article from a composite preform of two thermoplastic sheets. One sheet has a pattern of ridges or grooves, on a surface which contacts the other sheet, to permit the free flow of fluid from a marginal edge to interior regions of the preform. The apparatus includes (1) a heater, (2) mold platens which include a rib-forming mold cavity, (3) a ram to close and hold the mold platen in contact with the composite preform, and (4) a manifold which supplies a pressurized fluid to a marginal edge of the preform, thereby distending the thermoplastic sheet into the mold cavity. Then, the ram is further closed to seal nondistended areas of the preform, forming a hollow, laminated article.

11 Claims, 16 Drawing Figures

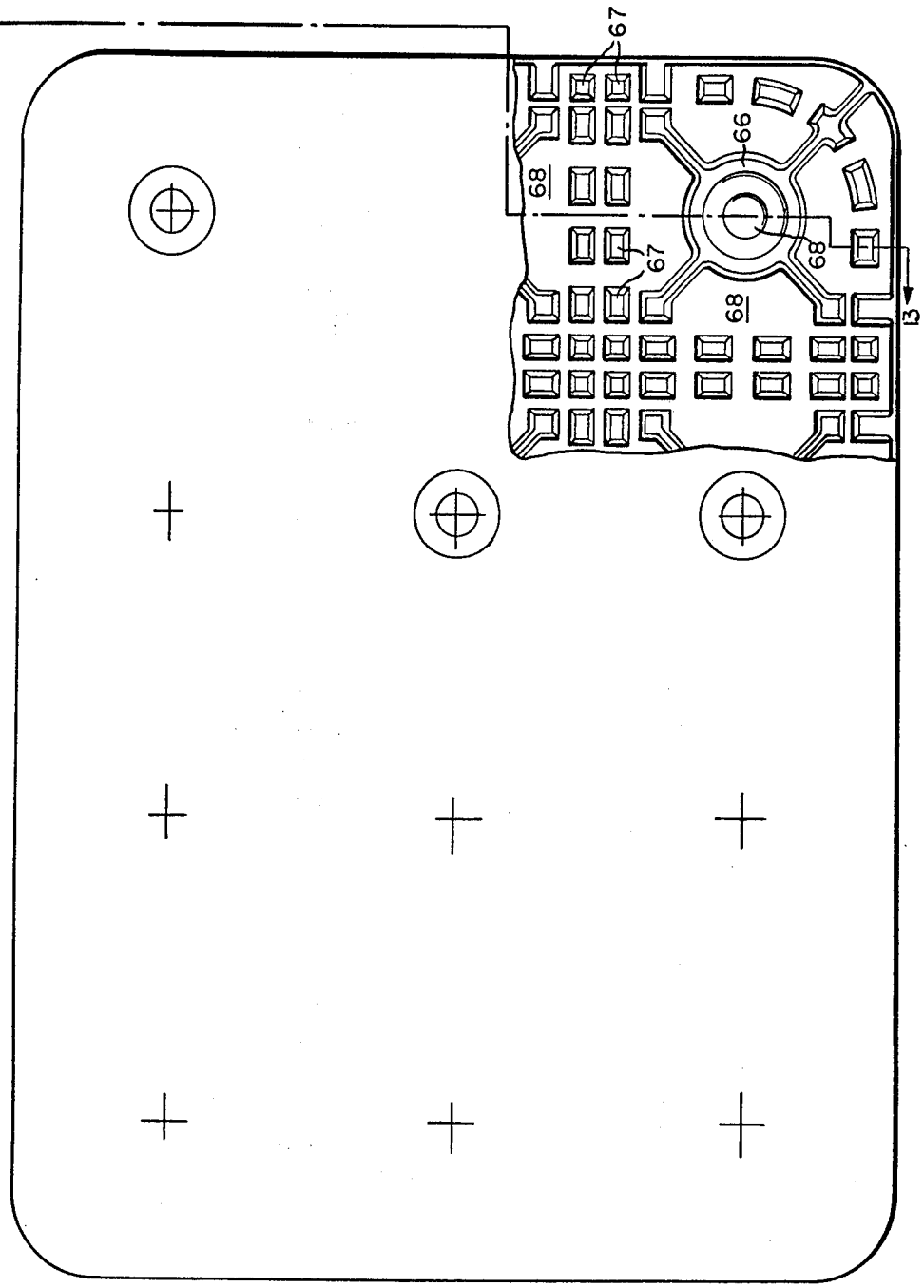

APPARATUS FOR EXPANDING SEALING A LAMINATED PLASTIC PREFORM

CROSS-REFERENCE TO RELATED CASES

This is a division of application Ser. No. 443,199, filed Feb. 15, 1974 now U.S. Pat. No. 3,935,358, patented Jan. 1, 1976, which in turn is a continuation-in-part of application Ser. No. 346,164, filed Mar. 29, 1973, now abandoned for A Process and Apparatus for Preparing a Hollow Rib-Reinforced Laminated Structure.

BACKGROUND OF THE INVENTION

This invention relates to apparatus for preparing a hollow, rib-reinforced, laminated article.

A general process for making laminated articles by first making a laminate preform from two thermoplastic sheets, then heating the preform, placing the heated preform between two mold halves, and blow-forming the article by introducing a fluid between the sheets to expand the sheets into their respective mold cavities, is well known in the art.

When the sheets are laminated to form a preform, however, they stick together and are very difficult to separate without tearing. This tendency of the sheets to stick together creates problems in introducing the blowing fluid between the sheets and in sheet separation as the blowing fluid expands the sheets into the mold cavity.

U.S. Pat. No. 3,281,301 discloses a method typical of the prior art wherein certain preselected areas of the interfacial surface between two laminated thermoplastic sheets are treated prior to lamination in such a manner as to make them nonadherent to each other. This can be accomplished by using a parting membrane such as paper or a layer of talc.

In addition, a bleeder member, such as a tube, is inserted between the sheets and is used to introduce air between the sheets. Air forced in between the sheets through the bleeder member follows the path progressively through the nonadherent areas distending the sheets in such areas.

In similar processes, see U.S. Pat. No. 3,271,846; 3,289,281; and 3,394,446 as the process applies particularly to thermoforming metal sheets.

These prior art processes have the disadvantage of requiring the use and placement of a nonadherent masking material on the sheets, which necessitates a separate operation and precludes subsequent sealing of the sheets where the masking material has been placed. Moreover, the laminated sheets must be precisely registered in the mold in order that the nonadherent areas conform with the recessed portions of the mold, and a bleeder member must be properly aligned with and inserted between the laminated sheets for the introduction of air.

Other related prior art includes processes wherein two thermoplastic webs are heated and fed either continuously or incrementally between two advancing opposed mold halves which have an opening for the insertion of a blow tube. The thermoplastic webs, however, are not laminated prior to or during forming but instead are spaced apart to aid in introducing air between the sheets.

In U.S. Pat. No. 3,537,138, for example, the advancing webs are spaced apart and brought together only at points forming the edge of the final article and at all times leaving an opening, such as the mouth of a bottle being formed, where air can be introduced between the sheets to blow the sheets apart and into their respective mold cavities.

In still another related patent, namely, U.S. Pat. No. 3,099,043, the advancing webs are spaced apart and brought into contact with two opposing and partially opened mold halves. The webs, respectively, are vacuum drawn into their corresponding mold half and thereafter the mold halves each containing half of a formed article are brought together fusing the edges of the article together forming the whole article while constantly maintaining communication between the atmosphere and the interior of the article being formed.

While many prior art processes are known for thermoforming plastic materials, there is a continuing need for a process having a convenient method for introducing air between the thermoplastic sheets. The need is especially apparent where the thermoformed article has an intricate design, such as a hollow rib-reinforced laminated article.

SUMMARY OF THE INVENTION

Accordingly, this invention provides apparatus for preparing a hollow, rib-reinforced, laminated article from a composite preform comprising at least two sheets, at least one sheet being a thermoplastic material and at least one sheet provided with grooves or integral projections, on the surface which contacts the other sheet, which form fluid passageways in the preform, said apparatus comprising:

a. means for heating the composite preform to the thermoforming temperature of the thermoplastic sheet;

b. opposing mold platens, at least one of the mold platens having a rib-forming mold cavity;

c. means for placing the heated composite preform between the mold platens with the thermoplastic sheet facing the mold cavity;

d. means for closing and holding the mold platens in contact with the composite preform, in which closed position the mold platens are spaced apart a distance equivalent to about the thickness of the composite preform;

e. means for supplying a fluid to a marginal edge of the composite preform while the mold platens are in the closed position, thereby distending the thermoplastic sheet into the mold cavity while the mold platens maintain contact between the sheets in nondistended areas; and f. means for further closing the mold platens an incremental amount insufficient to pressure seal at least a portion of the nondistended areas of the composite preform.

In alternate embodiments, the thermoplastic material can contain a filler; a preform can be used made up of two or more layers including other layers of thermoplastics or coatings; the fluid passageways can be formed by a pattern of interconnected or disconnected projections, grooves, embossed pits, valleys, or corrugations in one or both of the sheets; the mold can be of various configurations, such as one mold half having a smooth surface and the other mold half having a ribbed surface, or both halves can be shaped to a desired configuration; and fluid can be forced into the passageways by positive pressure, or drawn into the passageways as the sheet is distended into a vacuum mold, or by a combination of these methods. This process is particularly useful in the preparation of laminated structures having an intricate design of sealed hollow portions.

BRIEF DESCRIPTION OF THE DRAWINGS

FIG. 5 shows the preform being heated in an oven. FIG. 6 shows the heated preform placed between two opposing mold cavities. FIG. 7 shows the mold halves closed on the preform and air under positive pressure forced between the laminated layers forming the preform distending the preform into the mold cavity. FIG. 8 shows the completion of thermoforming process wherein the mold halves are opened and the thermoformed article is released from the mold cavity.

FIG. 12 is a fragmented plan view of a bobbin tray.

FIG. 13 is a fragmented cross section of the bobbin tray shown in FIG. 12.

DESCRIPTION OF THE PREFERRED EMBODIMENTS

Figure 1:
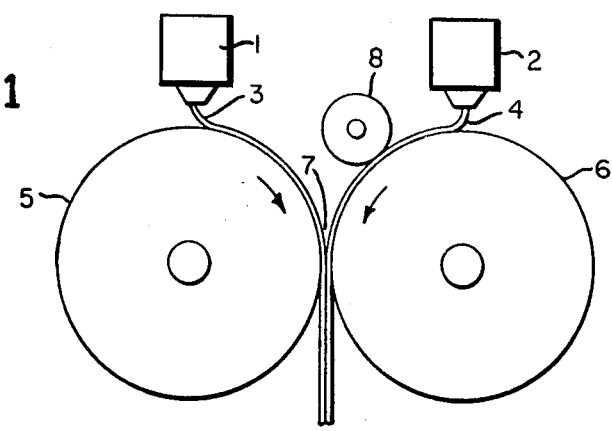
FIG. 1 is a schematic drawing showing the preparation of a preform useful in the present invention.

The invention will now be further described in terms of a preferred embodiment wherein two thermoplastic sheets are formed into a composite preform prior to being heated and positioned for molding. Use of a preform is preferred for convenience in handling, process control, and to maintain the sheets in proper alignment one with the other.

The thermoplastic composite preforms can be prepared from any sheet-forming thermoplastic that is thermoformable. While at least two sheets are contemplated to form the composite, three or more sheets can actually be used and each sheet can be made from the same or different thermoplastic. Useful thermoplastics include polyolefins having 2 to 10 carbons such as polyethylene and polypropylene, polyesters such as polyethylene terephthalate, polyamides such as nylon, polysulfones, polycarbonates, vinyls such as polyvinylchloride and polyvinyl acetate, polystyrene, and cellulosics such as cellulose acetate butyrate and cellulose propionate. Also contemplated are thermoplastic materials which, after thermoforming, can be thermoset to form articles which maintain their shape over wide temperature ranges.

These thermoplastic can optionally be filled with various types of fillers. The particular type and amount of filler chosen for use is dependent on the end result desired. For example, asbestos or aluminum oxide can be used to provide fire resistance. Fiberglass fillers can be used to provide reinforced films. Various colored fillers can be used as pigments, such as titanium dioxide. Clays can be used as bulk fillers and many other fillers can be used to reinforce the film to add strength or to modify other properties of the film such as stiffness, optical properties, etc.

Useful types of fillers include the following: asbestos, fiberglass, carbon, calcium phosphate, calcium carbonate, kaolinite clay, silica, titanium dioxide, bentonite, talc and mica.

The amount of filler used can vary from about 1 to 70 weight percent based on the weight of the polymer and filler present. It is preferred that the filler be present in the amount of about 1 to 60 weight percent based on the total weight of polymer and filler present. The preferred type filler for use is clay and it is preferred that the clay be present in the amount of about 30 to 60 weight percent based on the total weight of the polymer and filler present.

The thermoplastic polymers can be prepared by known methods. When fillers are used, they can be added to the thermoplastic polymers during the preparation of the polymers according to the conventional methods.

After the polymer is prepared, it is extruded through an extrusion die into a film that is cast onto a quenching drum. While being quenched, the surface of the film that will eventually be an interior interface in the composite preform structure is embossed, grooved or otherwise marked to provide passageways along the surface of the film. Alternatively, the passageways can be provided by extruding the film through a serrated die. While only one of the contracting surfaces at the interface in the composite structure need be provided with passageways, it is sometimes desirable that both surfaces at the interface that oppose each other in the interior portion of the composite be embossed or grooved to insure and provide an increased number of interior passageways. After marking, the film can be mechanically stretched to orient the film in order to improve strength properties.

A variety of methods can be employed to form the composite, depending on the thermoplastic material and on the desired degree of bonding. The bonding, however, must be weak enough that the sheets readily separate as they are distended into the mold cavity during thermoforming. Moreover, the method of forming the composite must preserve the fluid passageways.

Ultrasonic spot welding is a convenient method of forming composites of clay-loaded polyethylene sheets since the spot welds readily rupture during distension. Adhesive bonding can be employed for excellent contact bonding or electrostatic bonding can be used for loss bonding by providing a high voltage electrical discharge of opposite polarity on the exterior of the sheets. Thermal bonding can also be used by passing the sheets between heated rollers. If the sheets are susceptible to strong thermal bonding, or if strong adhesive bonding is used, the passageways should be formed by projections having a width less than the thickness of the sheet so that the projections, and not the sheets, rupture as the sheets are distended during thermoforming.

A convenient method of making the film composite preforms will be discussed in relation to FIG. 1. Referring to FIG. 1, film-forming extrusion devices 1 and 2 each extrudes thermoplastic films 3 and 4 that are cast onto quenching drums 5 and 6, respectively. The quenching drums 5 and 6 meet in nip-forming relationship wherein the nip 7 is a narrow gap with a space about equal to the combined thickness of the as-cast films 3 and 4. Roll 5 rotates clockwise and roll 6 rotates counterclockwise so that both films are conveyed into the nip.

As embossing roll 8 is positioned in nip-forming relationship with quenching drum 6 at a convenient location between the extrusion die and nip 7. The embossing roll marks that portion of film 4 with an appropriate embossing pattern that will form the interior surface of the resulting laminate.

After the films have been cast, and the interior surface of at least one film embossed, they pass through the nip formed by the quenching drums where they are lightly pressed together forming a continuous film composite that can be wound onto a mill roll or forwarded to a cutter and chipped into predetermined sheet lengths.

Figure 2:
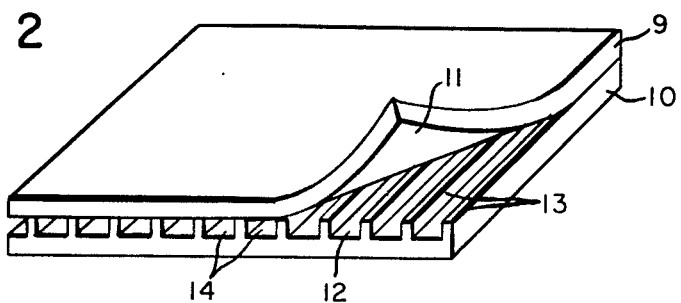
FIG. 2 shows an embodiment of a preform wherein the interfacial surface of one sheet is embossed with a pattern of parallel, extending, rectilinear-shaped lands and grooves. The fluid passageways are not interconnected.
Figure 3:
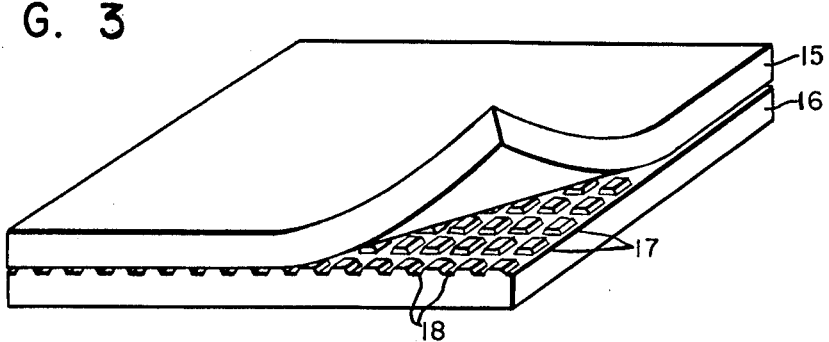
FIG. 3 shows an alernate embodiment of a preform wherein the interfacial surface of one sheet is embossed with a pattern of island-like, rectangular-shaped protuberances forming interconnected fluid passageways.
Figure 4:
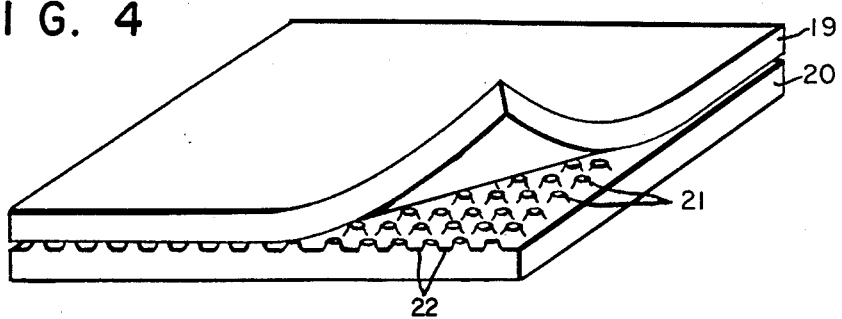
FIG. 4 is still another alternate embodiment of a preform wherein the interfacial surface of one sheet is embossed with a pattern of island-like, generally circular-shaped protuberances forming interconnected fluid passages.

The fluid passageways can be formed by a number of different patterns on the film surface. FIGS. 2, 3 and 4 are examples of projection patterns found useful in forming the fluid passages. The term "projection" as used herein refers to raised portions of the thermoplastic sheet.

FIG. 2 shows a laminated preform. The preform is composed of two thermoplastic sheets 9 and 10 laminated together. The interior surface 11 of sheet 9 is smooth and the opposing interior surface 12 of sheet 10 is embossed with a pattern which in cross section consists of rectangular-shaped protuberances 13 that extend in a continuous parallel pattern across the width of the sheet. The fluid passages 14 are formed by the open valleys between the protuberances bounded on top by films 11. The parallel fluid passageways are not interconnected. This pattern is particularly useful when relatively thin sheets are involved and intricate molding patterns are required. Where the hollow portions of the molding pattern are not interconnected, however, passageways communicating with each hollow portion must also communicate with the fluid source.

FIGS. 3 and 4 show other surface patterns with interconnected fluid passages that are useful in providing fluid passages between the composite sheets. The patterns shown have interconnected fluid passages. FIG. 3 shows two sheets 15 and 16 as a composite with the interior surface of sheet 16 having a pattern of protruding truncated rectangular projections 17 embossed thereon with fluid passages 18 provided between the projections.

FIG. 4 shows two sheets 19 and 20 laminated together with the interior surface of sheet 20 having a pattern of protruding truncated cylindrical-like projections 21 embossed thereon with fluid passages 22 provided between the projections.

Many other useful patterns, whether regularly or irregularly occurring on the interior surface of at least one sheet, are sufficient if they provide fluid passages between the sheets.

Once the film composite is prepared, depending on its physical properties such as thickness, flexibility and winding characteristics along with its ultimate intended use, it can be wound onto a mandrel or cut into sheets that are stacked for further use. For clarity in definitions, the term "preform", herein is used to denote a composite of at least two film sheets wherein the interfacial surface of at least one sheet is provided with fluid passages.

Use of the composite preform to make a hollow, ribbed, shaped article will now be described with particular reference to FIGS. 5, 6, 7 and 8 of the drawings.

The preform is heated to the thermoforming temperature of the thermoplastic. Thermoforming is described as a process of heating a thermoformable material, e.g., thermoplastic, to soften the material, forming the softened material into a desirable article by forcing the material into contact with a shape-forming mold, and quenching the formed material whereupon the material permanently takes on the shape of the mold.

The temperature to which the material is heated is called the "thermoforming" temperature and is described as that temperature of the material (usually a temperature range) wherein the material can be shaped to a selected contour and can permanently retain that shape when cooled and released from the shaping force.

The thermoforming temperature range can be empirically determined for a given material. The following test has been found useful:

The lowest forming temperature is that temperature at which a square box with fairly sharp and distinguishable corners can be drawn from a sheet of the material without any visual damage to the material. The highest forming temperature is that temperature at which a sheet of the material either gets so soft and fluid that it sags under its own weight (melt sag) or changes in appearance, schorches or degrades.

Some typical values of thermoforming temperature are as follows: branched polyethylene, 250°–375°F.; linear polyethylene, 300°–395°F.; polypropylene, 300°–395°F.; unoriented polyethylene terephthalate, 350°–400°F.; oriented polyethylene terephthalate, 380°–490°F.; and polycarbonate (polybisphenol-A carbonate), 440°–475°F.

Many different techniques of heating can be used including radiant heating, dielectric heating, convection heating, or contact heating as between two hot platens. For relatively thin preforms, it has been found desirable to heat the preform between two hot platens. The weight of the platens aids in keeping the thin sheets from curling or warping. Very thin preforms may exhibit a tendency to sag during heating. In such cases it may be desirable to hold the preform in the vertical plane to prevent disruption of the passageways during heating and while the preform is in the heated condition.

Figure 5:
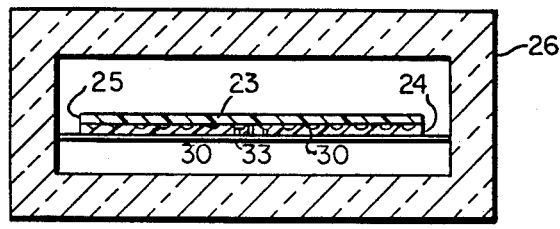
FIGS. 5 through 8 show various stages in the thermoforming process of the present invention.

Referring to FIG. 5, a preform 23, made up of two sheets 23 and 24 laminated together, is heated in an oven 26 to the thermoforming temperature of the film. After the preform 23 is heated, it is placed between two opposing mold platens 27 and 28 shown in FIG. 6. The mold platens are provided with cavities shaped to some desired configuration. It is important to note that the portion of the preform to be distended into a cavity of the mold does not touch any portion of the mold prior to blowing. Therefore, the sheet is not quenched by the mold in such areas and they remain relatively close to the original heating temperature resulting in excellent blowing characteristics.

This invention is particularly useful when at least one mold half 28 is shaped to reproduce distended portions 29 in the sheet to be blown. In this manner, articles such as automobile hoods and automobile paneling can be made having one side smooth for visual aesthetic effects and one side ribbed to provide improved strength properties.

The present invention is, however, also useful in making articles having shapes on both sides such as a stacking tray where the tray is shaped to fit over one article and under another.

Figure 7:
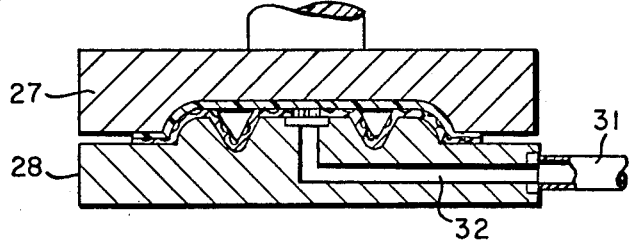

Once the preform is between the mold platens, the mold platens are mated as shown in FIG. 7 and a fluid is introduced into the fluid passageways 30 provided at the interior contact surfaces between two films. The fluid can be a gas such as air, which is the most practical fluid for use, but it can also be other gases such as nitrogen. In addition, the fluid can be a liquid such as water, a molten polymer, a liquid prepolymer, or foam in liquid form. Selection of heated air is preferred to avoid premature chilling of the preform. When the shaped article has thin walls, the heated air should be introduced under pressure to avoid formation of a partial vacuum, and possible wall collapse, as the article cools after molding.

The fluid can be forced into the internal passageway under positive pressure through one or more ports provided along the perimeter of the laminated sheet structure or the fluid can be drawn into the internal passageways by vacuum. In addition, the combination of vacuum and positive pressure can also be used to introduce the fluid into the fluid passageway. This is particularly useful in reducing mold cycle time.

When the vacuum technique is used, a practical way to apply the vacuum is to provide tiny pinholes through the mold platens, drawing a vacuum from the interior to the exterior of the mold through these pinholes. When a positive pressure is used, care must be taken to evacuate or otherwise eliminate the problem of trapping air in a mold cavity. This can be done by known techniques including the use of a vent in the bottom of the cavity, or lining the cavity with a screen, or roughening the surface of the mold cavity.

Figure 6:
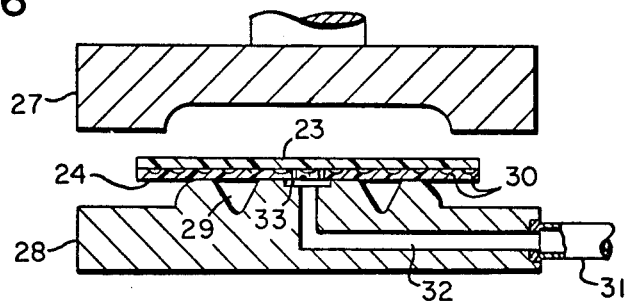
Figure 8:
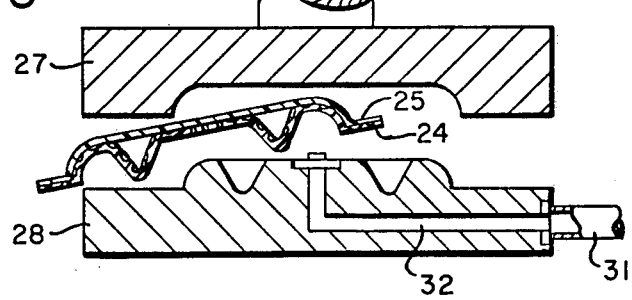

FIGS. 6, 7 and 8 show the use of positive pressure to force air into the fluid passageways between the two films forming the preform. Air from a compressor, not shown, is forced through conduit 31, through passageway 32 in the mold platen, through holes 33 in film sheet 24 into the fluid passageways 30 between the two sheets 23 and 24 forcing the films to blow apart and conform to the mold cavity and particularly distending sheet 24 into the hollow sections 29 of the mold. Hollow sections 29 of the mold have a roughened surface. FIG. 8 shows mold halves 27 and 28 parted and the article shaped from sheets 24 and 25 partially removed from the mold.

As fluid enters the internal passageways, it forces the laminated sheets apart at the places where a mold cavity exists forcing the sheet to conform to the mold cavity. Where the mold cavity exists, the sheets distend into the cavity forming a hollow shaped rib. Where a cavity does not exist, the sheets remain in contact. These contact points add strength and rigidity to the hollow articles being formed. An important aspect of this invention is the fact that the fluid passages provide immediate distribution of fluid between the sheets. This permits rapid distention of the sheets before any significant quenching affects the sheets, thereby providing excellent mold replication.

If it is desired that structural rigidity of the molded article be improved, adhesion can be established at the interfacial contact points of the sheets. Adhesion is conviently established, when the sheet can be thermally bonded, by heat or pressure or both. In this case, the mold can be designed with selective heating elements at the contact points on the mold and the mold further provided with two positions, one position to form the article and one position to seal the article, the article being formed with the mold platens slightly apart and subsequently the sealed areas formed with the mold platens tightly pressed to each other. Alternatively, a temperature activated adhesive can be employed when the two sheets will not bond together by high temperature and pressure alone. When such an adhesive is employed, the article is heated to the activation temperature after being molded.

By the application of sufficient pressure in sealing the article, one can also achieve a hermetic seal if desired. For example, the ridges shown in FIG. 2, or the projection pattern shown in FIG. 3, will readily flatten during the sealing operation to bring the two sheets into intimate bonded contact.

Figure 9:
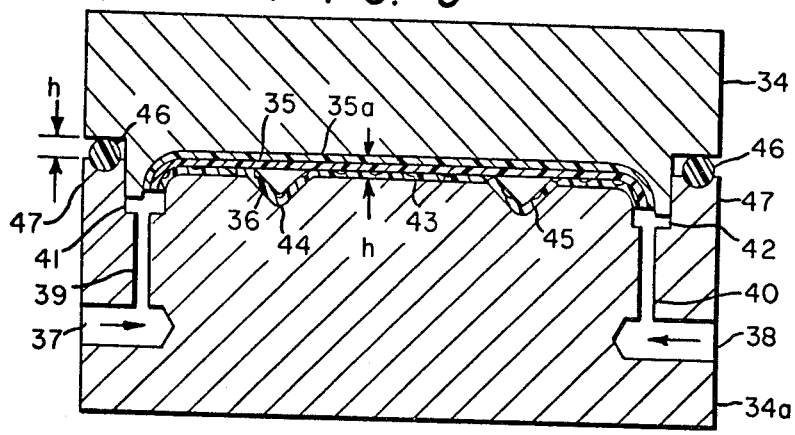
FIG. 9 shows an alternate embodiment of introducing air between the laminated preform by forcing air through the marginal edges of the preform. In addition, the mold incorporated therein is a two-position mold wherein the first position is held to form the product and thereafter the mold is closed an incremental amount to pressure fuse the nondistended areas of the preform.

FIG. 9 shows in cross section the use of a two-position mold and a method of introducing air into oblique directed passageways of the preform at the sheet interface along two edges of the preform. In addition, the preform is made of three thermoplastic sheets laminated together with fluid passages provided only at the interface between sheets 35, 35a and 36. Optionally, sheet 36 could also be laminated to still another thermoplastic sheet or sheets 35 and 36 could be coated either prior to or after thermoforming.

Blow forming takes place in a two-step operation whereby in the first step the mold halves are first brought together a predetermined amount indicated as $h$ in the drawings just prior to the introduction of the pressurized fluid. As shown in FIG. 9, the actual gap $h$ separating mold halves 34 and 34a is coincident with the combined thickness of the upper 35 plus 35a (a barrier or gloss layer) and lower 36 preheated film sheets in the unblown state. This gap distance $h$ will vary depending on the combined thickness of the sheets.

As soon as the mold halves are brought together, the air is introduced through air inlets 37 and 38. The air travels along air passages 39 and 40 into air gap 41 and 42 and into the interface between sheets 35 and 36 through air passageways 43. Air in passageways 43 between the film sheets (that were preheated to their thermoforming temperature) blows the sheets apart to separate and distend them into the predetermined rib-forming cavity regions 44 and 45. Mold cavity regions 44 and 45 have a roughened surface. This is followed immediately by an incremental closing of the mold halves 34 and 34a reducing gap height $h$ by an amount sufficient to pressure seal or fuse together the existing contact points between sheets 35 and 36 remaining after the blowing step. To aid in sealing the mold chamber and act as a limit stop to keep the mold halves apart, a resilient gasket 46 is disposed along the top of a raised rim portion 47 of mold half 34. The raised rim portion also functions as a guide to the mating of the mold halves.

The additional movement compresses the layers tightly together causing minor deformation of the open grooves and slight expansion or flattening of the bonded portions of the protuberances. The net effect of the final motion is an increase in the bond area and a stronger final product. Thereafter, the mold halves are separated and the finished product removed.

Figure 10:
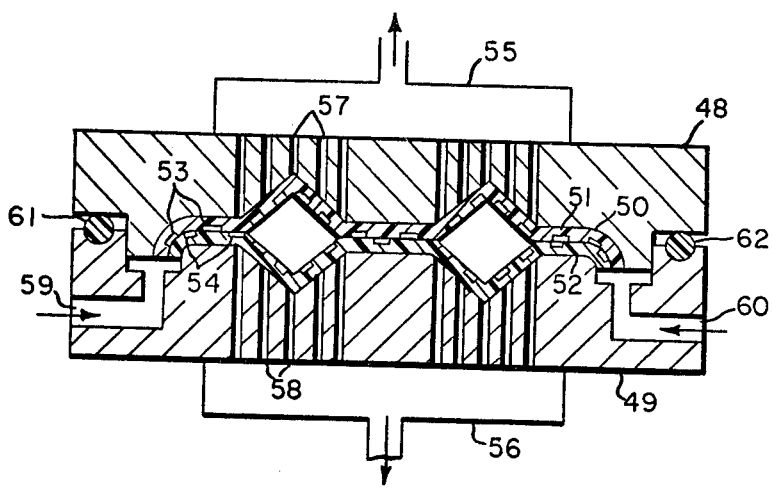
FIG. 10 shows an alternate embodiment of introducing air between the laminated preform by drawing a vacuum in the mold cavity which in turn draws air in through the marginal edges of the preform, into the interfacial surface between the laminated layers through the fluid passageways provided in the interfacial surfaces, forcing the laminated sheets to separate and conform to the mold cavity. Optionally, the mold can be further closed an incremental amount to pressure fuse the non-distended areas of the preform.

FIG. 10 shows an alternate method of thermoforming using a vacuum technique to draw air into the interfacial boundary between the two sheets constituting the preform.

Referring to FIG. 10, mold halves 48 and 49 are shown in mating relationship having a preform 50 sandwiched between the molds. Preform 50 is comprised of two sheets 51 and 52 and the interfacial surfaces of both sheets are provided with fluid passages 53 and 54, respectively.

In operation, a vacuum is drawn on vacuum chambers 55 and 56 which evacuates the mold cavity by drawing air through multiple passages leading from the mold cavity to the vacuum chambers wherein the passages are designated by numerals 57 and 58. This in turn draws air from the atmosphere into the mold through ports 59 and 60 and into the interfacial boundary between sheets 51 and 52 through fluid passages 53 and 54 forcing the sheets to distend and conform to their respective mold cavity.

To aid in sealing the mold chamber and act as a limit stop to keep the mold halves slightly apart, resilient gaskets 61 and 62 are disposed along the top of a raised rim portion of mold half 49.

EXAMPLE 1

A preferred embodiment of the present invention will now be described with particular reference to FIGS. 11, 12 and 13.

High-density polyethylene, namely, Alathon 7030 (trademark of E. I. duPont de Nemours & Co. for polyethylene resin), having a density of 0.96 and a melt index of 2.8 in the amount of 60 parts by weight is melt blended with 40 parts by weight of kaolinite clay (Harwick GK Clay) and cast into two sheets each 30 mils thick, having dimensions of about 28.5 inches in length and 21.5 inches in width.

One side of one sheet is embossed with a regular pattern of raised ridges and valleys. The ridges and valleys run parallel to each other traversing the width of the sheet in a line perpendicular to the long axis, i.e., the longitudinal axis, of the sheet.

The ridges and valleys have a general pattern similar to that shown in FIG. 2 with the exception that the projections do not have squared off corners but instead the projections have a cross section in the shape of a trapezoid.

After the sheets have been cast and the surface of one sheet embossed, the sheets are placed together with the embossed surface in the interface between the two sheets to form a preform.

The sheets are laminated under light pressure, during the heating step, by placing the sheets between two flat-surfaced platens heated to a temperature of about 270°F. The sheets are left between the platens for a time that can vary from about 3.5 to 4 minutes. Depending on the residence time, the sheets themselves will be heated to a temperature of about 250° to 270°F.

Figure 11:
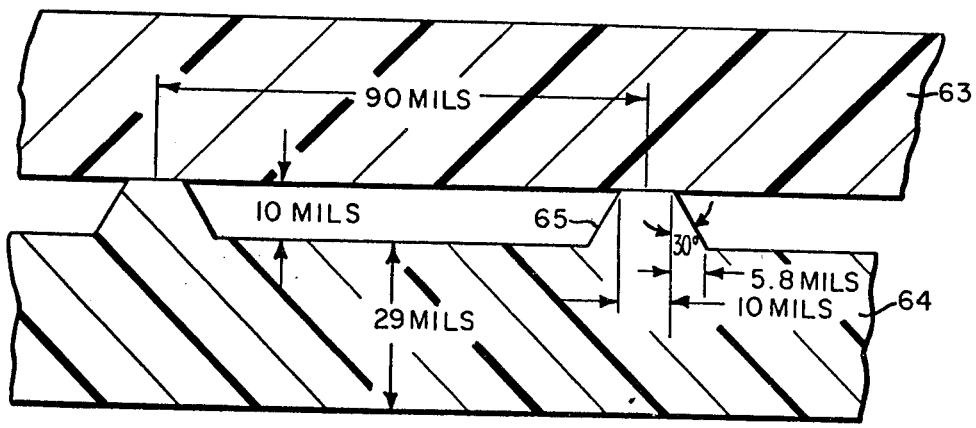
FIG. 11 is a fragmented cross section of the preferred preform taken along the longitudinal axis of the preform.

FIG. 11 is a fragmented cross section of the preform taken perpendicular to the ridges and valleys. Referring to FIG. 11, the preform is made up of two laminated sheets 63 and 64. Sheet 63 is 30 mils thick and has two smooth surfaces and sheet 64 has one embossed and one smooth surface. The embossed surface is at the interface between the two sheets.

Sheet 64 has a thickness of 29 mils in the areas where there are no projections and a thickness of 39 mils in the area of the projections 65. The projections themselves are 10 mils high and are spaced apart a distance of 90 mils center-to-center. The trapezoidal section itself is 10 mils wide at the top, 21.6 mils wide at the bottom and has a height of 10 mils.

The heated preform is placed in a mold that is designed to reproduce a bobbin tray. The mold is at room temperature. The mold is closed and a vacuum of about 29 inches of mercury is applied to the mold cavity. As the mold is evacuated, it draws air into the fluid passages in the preform through the marginal edges of the preform. The air in the fluid passages separates the sheets distending them into the recesses of the mold cavity. Vacuum is applied for about 5 to 8 seconds, the mold halves are separated, and the finished article removed.

The thermoplastic articles of the present invention are comprised of (a) at least two laminated thermoplastic sheets wherein the interfacial surface of at least one sheet is provided with fluid passageways and (b) distended and nondistended areas in the thermoplastic sheets formed by a fluid introduced into the fluid passageways between the two sheets to separate the sheets and force the sheets into a desired configuration wherein the opposing nondistended areas provide contact points to hold the article together, the distended areas provide the article with the desired shape and the combination of distended and nondistended areas provide integral ribs that reinforce and contribute to the structural integrity of the article.

FIG. 12 is a fragmented view of a hollow, rib-reinforced, laminated structure in the form of a bobbin tray, representing the preferred embodiment. FIG. 13 is a cross section along line 13—13 of FIG. 12. The circular portions 66 of the tray provide recesses on both sides of the tray to contain one end of a bobbin. With a recessed pattern on both sides of the tray, trays containing bobbins can be stacked on top of each other. The pattern of island-like recesses 67 and protuberances 68 from ribs that add to the strength of the tray which is important during the handling of the trays in use. In general, the ribs can be short or elongated, curved or straight, and form a pattern in one or multiple directions. These ribs add significantly to the structural integrity of the article.

EXAMPLE 2

A second embodiment will now be described with particular reference to FIGS. 14 through 16.

Two sheets of clay-loaded polyethylene, having the composition described in Example 1, are laminated to form a composite by heating the surface of the sheets and bringing them together by means of a nip roll, or by broad area ultrasonic bonding. Each sheet is 45 mils thick and 31 inches long by 24 inches wide. One sheet has an embossed pattern of ridges having a height of 10 mils, and the composite has the configuration shown in FIG. 11 except that the ridges are spaced 100 mils center to center.

Figure 14:
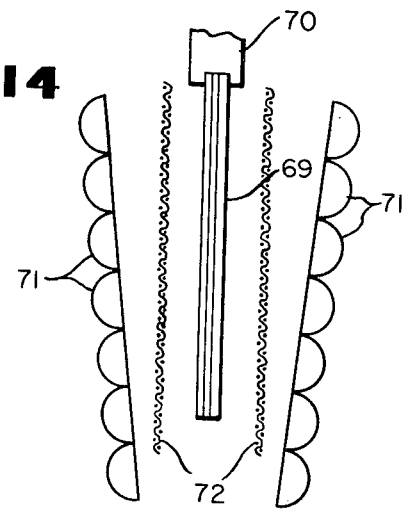
FIG. 14 is a cross section of a heater useful in preheating the preform, taken in the vertical plane.

Referring to FIG. 14, the composite 69 is hung from a clamp-air manifold mechanism 70 with the ridges in the vertical direction, which mechanism in turn is suspended from a conveyor chain (not shown). The clamp-air manifold both holds the composite as it is suspended between two banks of radiant heaters 71 and serves as an air manifold during the subsequent thermoforming operation.

The heaters are inclined at a slight angle such that the top and bottom of the heaters are spaced 12 and 8 inches, respectively, from the composite. This spacing helps compensate for a chimney effect in which the bottom of the composite tends to cool as the heat rises. Heat distribution is also regulated by a modulating screen 72 of wire screening or perforated sheet metal placed between the heat source and the composite to shield central portions of the laminate from excessive heating. A perforated sheet metal screen having about 50% open area, triangular openings which increase heat intensity of the vertical and lower horizontal edges of the composite, and circular openings which increase heat intensity in a selected narrow band adjacent the upper horizontal edge of the composite, has proven effective.

The composite remains between the radiant heaters for approximately 2 minutes and is heated to about 250° to 280°F.

Figure 15:
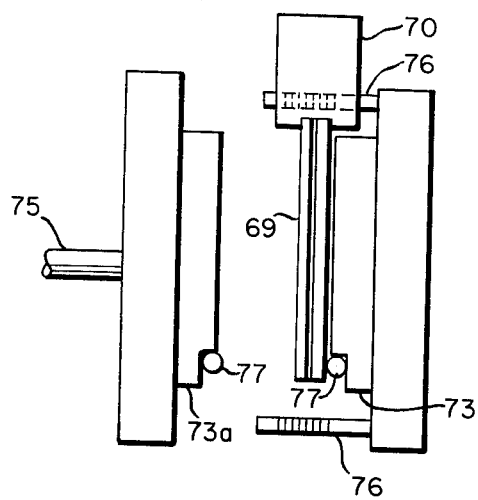
FIG. 15 is a cross section of an embodiment wherein the mold and preform are vertically aligned.
Figure 16:
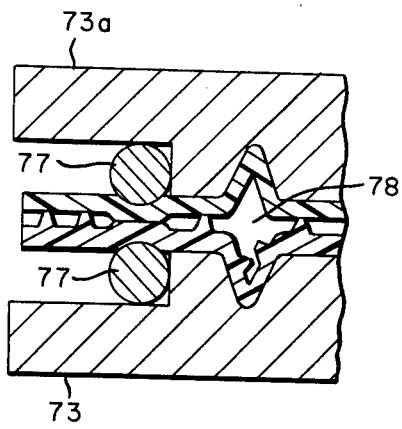
FIG. 16 is a cross section in the horizontal plane of the mold of FIG. 15 in the closed position.

Referring to FIG. 15, the heated composite 69 still gripped by the clamp-air manifold mechanism 70 is placed between two mold halves, 73 and 73a. Mold half 73 is mounted on a stationary mold platen 74 which is firmly anchored to a frame (not shown). Mold half 73a is mounted on a movable mold platen 74a which is actuated by a hydraulic ram 75. The mold halves are designed to produce the bobbin tray of FIG. 12 and are at room temperature.

After the composite has been placed between the two mold halves, a closing pressure of 6,000 to 7,000 pounds is applied to mold half 73a by the hydraulic ram. This closing pressure causes the mold to close to a first position at which there is a gap between the mold halves approximately equal to the thickness of the composite. The gap width is regulated by control springs 76 disposed along the rim of the stationary mold platen which engage the moving platen as the mold closes.

Pinch bars 77 are provided on the bottom edge and two vertical edges (not shown) of the mold halves. The pinch bars are adjacent to and extend about 7 mils beyond the face of the mold halves so that they seal the bottom and two vertical edges of the composite as the mold closes to its first position. A sealed vertical edge is shown in FIG. 16 which is a partial horizontal cross-section taken through the composite and mold in the first position.

As the mold is closing, a vacuum of about 20 inches mercury is applied to the mold cavity through holes provided in the mold. The vacuum draws the sheets toward the mold cavity, separating and distending the sheets into mold cavity recesses 78, and drawing air into the recesses through the composite fluid passageways.

After the pinch bars have sealed all edges except the upper horizontal composite edge held by the clamp-air manifold mechanism, warm air under 15 to 20 psi pressure is fed from the air manifold, through the composite fluid passageways, and into the mold cavity recesses. The warm air pressurizes the tray, preventing collapse of hollow portions of the final product when cooled. The pressurized air also assists in achieving mold replication.

A closing pressure in excess of 7,000 pounds is then applied to advance mold half 73a 10 mils forward toward mold half 73. During this high pressure stage the two tray halves are permanently welded together, the fluid passageways are eliminated by flattening of the projections, and the fourth edge of the composite is sealed.

The total time required for both the low and high pressure mold stages is 2½ to 3 seconds, after which the mold is held closed to allow the formed tray to cool. The mold halves are then separated and the finished article is removed.

The process of the present invention is particularly adapted for the manufacture of thermoformed articles having a complex pattern of hollow spaces which rib-reinforce the article. Rapid cycles can be achieved since the fluid passageways provided in the composite preform permit use of a pressure assist to vacuum drawing. The use of pressurized fluid gives better mold replication than that achieved through vacuum drawing alone, and permits thermoforming of sheets not formable by vacuum alone.

The process obviates the need for using a patterned nonadherent material (stop-weld) on the interfacial surfaces, eliminating the requirement that the preform be precisely registered with the mold. Moreover, the process avoids the need to insert a fluid supply means at locations of the hollow portions of the thermoformed articles, likewise, eliminating registry problems.

While the process has been described in detail with respect to use of a sheet which has been extruded through a serrated die, embossed, or otherwise marked to provide the fluid passageways, the passageways can also be formed by other methods which form integral projections on the sheet, e.g., by melt extruding a continuous or discontinuous pattern of polymer onto the sheet, such as patterns shown in FIGS. 2 through 4. By "integral" is meant that the projections firmly adhere to the sheet so that they are not dislodged before the sheet is thermoformed. When melt extruding polymer onto the sheet to form the projections, a polymer is generally selected which will thermally bond to the sheet prior to or during the thermoforming process.

The composite preform and rib-reinforced laminated structure are disclosed in detail and claim in coassigned copending patent application Ser. No. 346,163 of Wyeth and Arnoth, filed on Mar. 29, 1973, now abandoned incorporated herein by reference.

We claim:

1. Apparatus for preparing a hollow, rib-reinforced, laminated article from a composite preform comprising at least two sheets in interfacial contact, at least one sheet being a thermoplastic material and at least one sheet provided with grooves or integral projections on the surface which contacts the other sheet, which grooves or integral projections form fluid passageways in the preform, said apparatus comprising:

a. means for heating the composite preform to the thermoforming temperature of the thermoplastic sheet;
 b. opposing mold platens operatively associated with said heating means, at least one of the mold platens having a rib-forming mold cavity, said mold platens having a thermoforming position in which the platens are spaced apart a distance equivalent to about the thickness of the composite preform and a sealing position in which the platens are further closed an incremental amount;
 c. means operatively associated with said platens for placing the heated composite preform including the edges thereof, between the mold platens with the thermoplastic sheet facing the mold cavity;
 d. means operatively associated with said platens for closing and holding the mold platens in contact with the composite preform in said thermoforming position;
 e. means located within a mold platen for supplying a fluid to a marginal edge of the composite preform while the mold platens are in said thermoforming position, thereby distending the thermoplastic sheet into the mold cavity while the mold platens maintain contact between the sheets in nondistended areas; and
 f. means operatively associated with said platens for further closing the mold platens an incremental amount to said sealing position to pressure seal at least a portion of the nondistended areas of the composite preform.

2. Apparatus for preparing a hollow, rib-reinforced, laminated article from a composite preform comprising at least two sheets in interfacial contact, at least one sheet being a thermoplastic material and at least one sheet provided with grooves or integral projections on the surface which contacts the other sheet, which grooves or integral projections form fluid passageways in the preform, said apparatus comprising:

a. means for heating the composite preform to the thermoforming temperature of the termoplastic sheet;
 b. opposing mold platens operatively associated with said heating means, at least one of the mold platens having a rib-forming mold cavity, said mold platens having a thermo-forming position in which the platens are spaced apart a distance equivalent to about the thickness of the composite preform and a sealing position in which the platens are further closed an incremental amount;
 c. clamp means operatively associated with said platens for holding an edge of the composite preform and for placing the heated composite preform between the mold platens with the thermoplastic sheet facing the mold cavity;
 d. means operatively associated with said platens for closing and holding the mold platens in contact with the composite preform in said thermoforming position;
 e. said mold platens having means for sealing all of the edges of said composite preform except one marginal edge thereof;
 f. means operatively associated with said platens for supplying a fluid to said one marginal edge of the composite preform while the mold platens are in said thermoforming position, thereby distending the thermoplastic sheet into the mold cavity while the mold platens maintain contact between the sheets in nondistended areas; and
 g. means for further closing the mold platens an incremental amount to said sealing position to pressure seal at least a portion of the nondistended areas of the composite preform.

3. The apparatus of claim 2 wherein the means for heating the composite preform is a radiant heater.

4. The apparatus of claim 2 including means operatively associated with said platens to draw a vacuum in the mold cavity.

5. The apparatus of claim 2 including means operatively associated with said platens to supply fluid to a marginal edge of the composite preform under pressure.

6. The apparatus of claim 5 wherein the pressurized fluid supply means includes an air manifold adapted to grasp a marginal edge of the composite preform and communicate with the fluid passageways.

7. The apparatus of claim 6 wherein the mold platens are provided with an element to seal marginal edges of the composite preform, not in communication with the air manifold, when the mold platens are in the closed position.

8. The apparatus of claim 7 including means operatively associated with said platens to draw a vacuum in the mold cavity.

9. The apparatus of claim 2 wherein the mold platens are in vertical alignment.

10. The apparatus of claim 3 in which said means for supplying a fluid to said one marginal edge of the composite preform that is located in said clamp means.

11. The apparatus of claim 2 in which the said means for further closing the mold platens further comprises means for effecting a seal around the entire perimeter of the composite preform inclusive of the portion of the preform contiguous with said clamp means.

* * * * *